(12) United States Patent
Arnold et al.

(10) Patent No.: US 7,823,018 B2
(45) Date of Patent: Oct. 26, 2010

(54) METHODS, SYSTEMS AND COMPUTER PROGRAM PRODUCTS FOR CPU SIGNATURING TO AIDE IN PERFORMANCE ANALYSIS

(75) Inventors: Jeremy A. Arnold, Rochester, MN (US); Scott A. Moore, Rochester, MN (US); Gregory A. Olson, Rochester, MN (US); Eric J. Stec, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 12/120,955

(22) Filed: May 15, 2008

(65) Prior Publication Data
US 2009/0287960 A1    Nov. 19, 2009

(51) Int. Cl.
*G06F 11/00* (2006.01)
(52) U.S. Cl. .............................. 714/32; 714/28; 714/37; 714/38
(58) Field of Classification Search .................. 714/28, 714/32, 37, 38, 45, 47
See application file for complete search history.

(56) References Cited
U.S. PATENT DOCUMENTS

| | | | |
|---|---|---|---|
| 5,604,895 A * | 2/1997 | Raimi ......................... 703/13 |
| 5,933,594 A | 8/1999 | La Joie et al. |
| 5,970,246 A * | 10/1999 | Moughani et al. ........... 717/128 |
| 6,173,416 B1 | 1/2001 | Liddell et al. |
| 6,357,024 B1 * | 3/2002 | Dutton et al. ................. 714/45 |
| 7,437,619 B2 * | 10/2008 | McCullough et al. ......... 714/45 |
| 7,502,966 B2 * | 3/2009 | Buchonina et al. ............ 714/33 |
| 7,577,876 B2 * | 8/2009 | Boyce .......................... 714/39 |
| 7,624,378 B2 * | 11/2009 | Achlioptas et al. .......... 717/124 |
| 7,673,188 B2 * | 3/2010 | Choate et al. ................. 714/45 |

* cited by examiner

*Primary Examiner*—Joshua A Lohn
(74) *Attorney, Agent, or Firm*—Cantor Colburn LLP

(57) ABSTRACT

Methods, systems and computer program products for CPU signaturing to aide in performance analysis. Exemplary embodiments include a performance analysis method including identifying a workload having one or more testcases, assigning a CPU signature to each of the one or more testcases, calling a CPU signature application programming interface that toggles the CPU to generate the CPU signature, passing four parameters to the CPU signature application programming interface, prior to running each of the one or more testcases of the workload, generating the CPU signature, dynamically determining a run order of the one or more testcases at a run time of the workload and reviewing performance data during the running of each of the one or more testcases, each of the one or more testcases being identifiable by its respective CPU signature.

1 Claim, 3 Drawing Sheets

METHODS, SYSTEMS AND COMPUTER PROGRAM PRODUCTS FOR CPU SIGNATURING TO AIDE IN PERFORMANCE ANALYSIS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to performance analysis, and particularly to methods, systems and computer program products for CPU signaturing to aide in performance analysis.

2. Description of Background

In many cases, performance testing involves running a series of tests on a particular system. This series of tests is frequently automated so that many hours of testing can be completed with little or no user intervention. At the conclusion of these tests, the performance analyst frequently needs to look at system performance data (such as CPU utilization) to determine how well the tests ran. Correlating this system performance data with individual tests can be a challenge.

Typical "solutions" to this problem involve comparing timestamps with a log file showing when each test began and ended. Another approach is to monitor the tests manually as they are running to determine the start and stop time of each test, or to run each test manually one at a time. In addition, a user can embed an indicator in the same data that the user is collecting. All of these solutions are time consuming manual processes.

While this issue is especially prevalent in performance testing, similar issues can occur in functional testing, or even while monitoring production environments.

SUMMARY OF THE INVENTION

Exemplary embodiments include a performance analysis in a computer system having a CPU, the method including identifying a workload having one or more testcases, the workload configured to generate a performance run by invoking applications that simulate certain interactions in the performance analysis, assigning a CPU signature to each of the one or more testcases, calling a CPU signature application programming interface that toggles the CPU to generate the CPU signature, passing four parameters to the CPU signature application programming interface, the four parameters including a CPU signature value, a CPU signature duration, a CPU signature number and a CPU signature idle, prior to running each of the one or more testcases of the workload, generating the CPU signature, the CPU signature showing the CPU running at the CPU signature value for the CPU signature duration a total of the CPU signature value with a CPU signature idle time period between each of the one or more testcases, dynamically determining a run order of the one or more testcases at a run time of the workload and reviewing performance data during the running of each of the one or more testcases, each of the one or more testcases being identifiable by its respective CPU signature, wherein the CPU signatures are generated from the group consisting of: CPU utilization, disk access, memory allocation and thread allocation.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides the ability to assign CPU signatures to testcases in a workload for performance runs that are done by invoking "driver" programs, scripts or other software applications that simulate certain interactions with software that are exercising for performance analysis. An API allows the programs, scripts or software applications to toggle the CPU in such a manner that produces a "CPU signature". By assigning each testcase its own signature, the system can know exactly which testcase is running while reviewing the performance data.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments include methods and systems that provide performance runs on a computer system that are performed by invoking driver programs, scripts, or other software applications that simulate certain interactions with target software. In exemplary embodiments, the methods and systems described herein provide an application program interface (API) that allows the driver programs, scripts, or other software applications to toggle the CPU in such a manner that it would produce a "CPU signature." The CPU signature would thus represent a recognizable pattern of CPU activity that is unique for a specific testcase, thus marking the beginning and end of each testcase. As such, a user correlates specific performance data with individual tests when multiple testcases are run.

In exemplary embodiments, the methods and systems described herein incorporate a unique "CPU signature" that could be used to indicate the beginning and the end of each testcase. As such, the user can concentrate on the performance data and no longer needs to combine performance data with log information. In exemplary embodiments, the "CPU signature" is a recognizable pattern of CPU activity that is unique to the particular testcase. As such, the CPU is readily recognizable within the performance data marking the beginning/end of each testcase.

Figure 1:
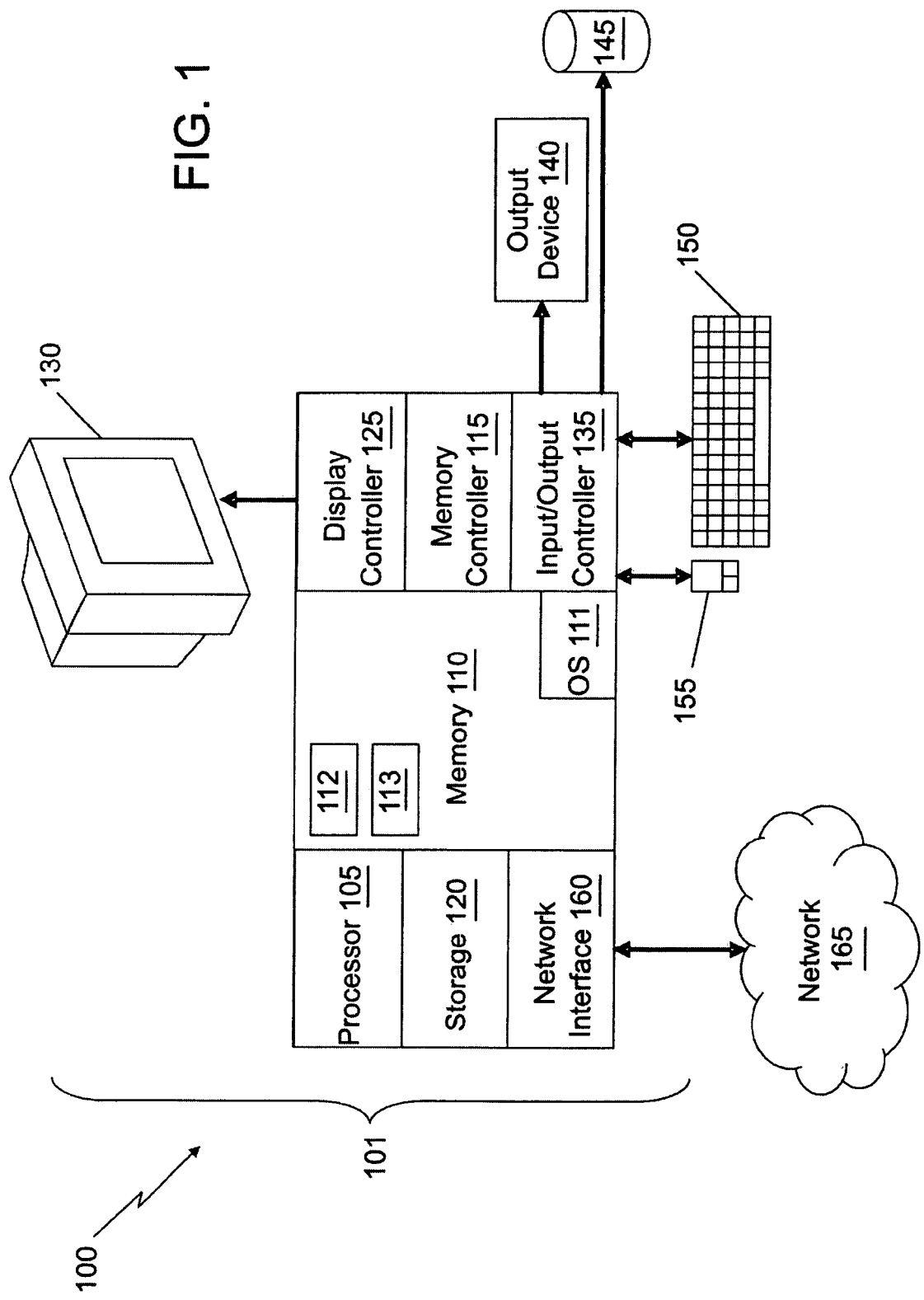
FIG. 1 illustrates an exemplary embodiment of a system for CPU signaturing to aide in performance analysis.

FIG. 1 illustrates an exemplary embodiment of a system 100 for CPU signaturing to aide in performance analysis. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the CPU signaturing performance analysis methods described herein in accordance with exemplary embodiments and a suitable operating system (OS) 111. The operating system 111 essentially controls the execution of other computer programs, such the CPU signaturing performance analysis systems and methods described herein, and provides scheduling, input-output control, file and data management, memory management, and communication control and related services.

The CPU signaturing performance analysis methods described herein may be in the form of a source program, executable program (object code), script, or any other entity comprising a set of instructions to be performed. When the CPU signaturing analysis methods are in the form of a source program, then the program needs to be translated via a compiler, assembler, interpreter, or the like, which may or may not be included within the memory 110, so as to operate properly in connection with the OS 111. Furthermore, the CPU signaturing performance analysis methods can be written as an object oriented programming language, which has classes of data and methods, or a procedure programming language, which has routines, subroutines, and/or functions. As discussed above, the memory 110 can include some sort of testcase 112 (e.g., driver programs, scripts, or other software applications that simulate certain interactions with target software) and an API 113 that allows the driver programs, scripts, or other software applications to toggle the CPU (e.g., the processor 105) in such a manner that it would produce a "CPU signature."

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The CPU signaturing performance analysis methods described herein and the OS 111, in whole or in part, but typically the latter, are read by the processor 105, perhaps buffered within the processor 105, and then executed.

When the systems and methods described herein are implemented in software, as is shown in FIG. 1, then the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The CPU signaturing performance analysis methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the CPU signaturing performance analysis methods are implemented in hardware, the CPU signaturing performance analysis methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, performance runs are done by invoking "driver" programs, scripts or other software applications that simulate certain interactions with software that are executing for performance analysis. As discussed above, the API 113 allows the programs, scripts or software applications to toggle the CPU in such a manner that produces a "CPU signature".

For example, the system 100 can be running a workload that contains six different testcases. In exemplary embodiments, the order in which the test cases are run is known. As such, for this six test case workload run, the same "CPU signature" is implemented between the start of each testcase. In addition, prior to each testcase, the API 113 is called and is passed four parameters: 1) the CPU signature value 2) the CPU signature duration 3) the CPU signature number and 4) the CPU signature idle. In this example, the four above-described parameters can be 100, 5, 3 and 2, respectively. Then prior to each testcase starting, a "CPU signature" is generated, the CPU signature showing the CPU running at 100% for 5 seconds a total of 3 times with a 2 second idle time between each of testcase. It is appreciated that in other exemplary embodiments, the API can include different parameters. The API could have more or fewer parameters. For example, an implementation could expose an API which had a single parameter for the number of bursts, and essentially assume the defaults for the CPU utilization, length of a burst, and length of idle time. In further exemplary embodiments, the systems and methods can include a complex API, which allowed for a more complex signature (3 bursts of 2 seconds followed by 1 burst of 10 seconds followed by 2 bursts of 1 second, with 3 seconds between each burst).

It is appreciated that the exact mechanism of generating the signature can vary from one implementation to another. In exemplary embodiments, CPU utilization can generate the CPU signature. In another exemplary embodiments, other attributes such as disk access can also be implemented. Further examples for generating the signature include: memory allocation where a predetermined amount of memory is allocated then freed, also disk accesses where a combination of disk reads and writes are performed, also thread allocation where a predetermined number of threads are allocated then freed from a process. It is appreciated that regardless of the CPU generation implementation, a predictable pattern of utilization is visible in the performance data.

In exemplary embodiments, the system 100 can run multiple testcases where the order of their running is determined dynamically at run time. In addition, the system 100 assigns each testcase their own "CPU signature" that allows the system 100 to know exactly which testcase is running while reviewing the performance data.

Figure 2:
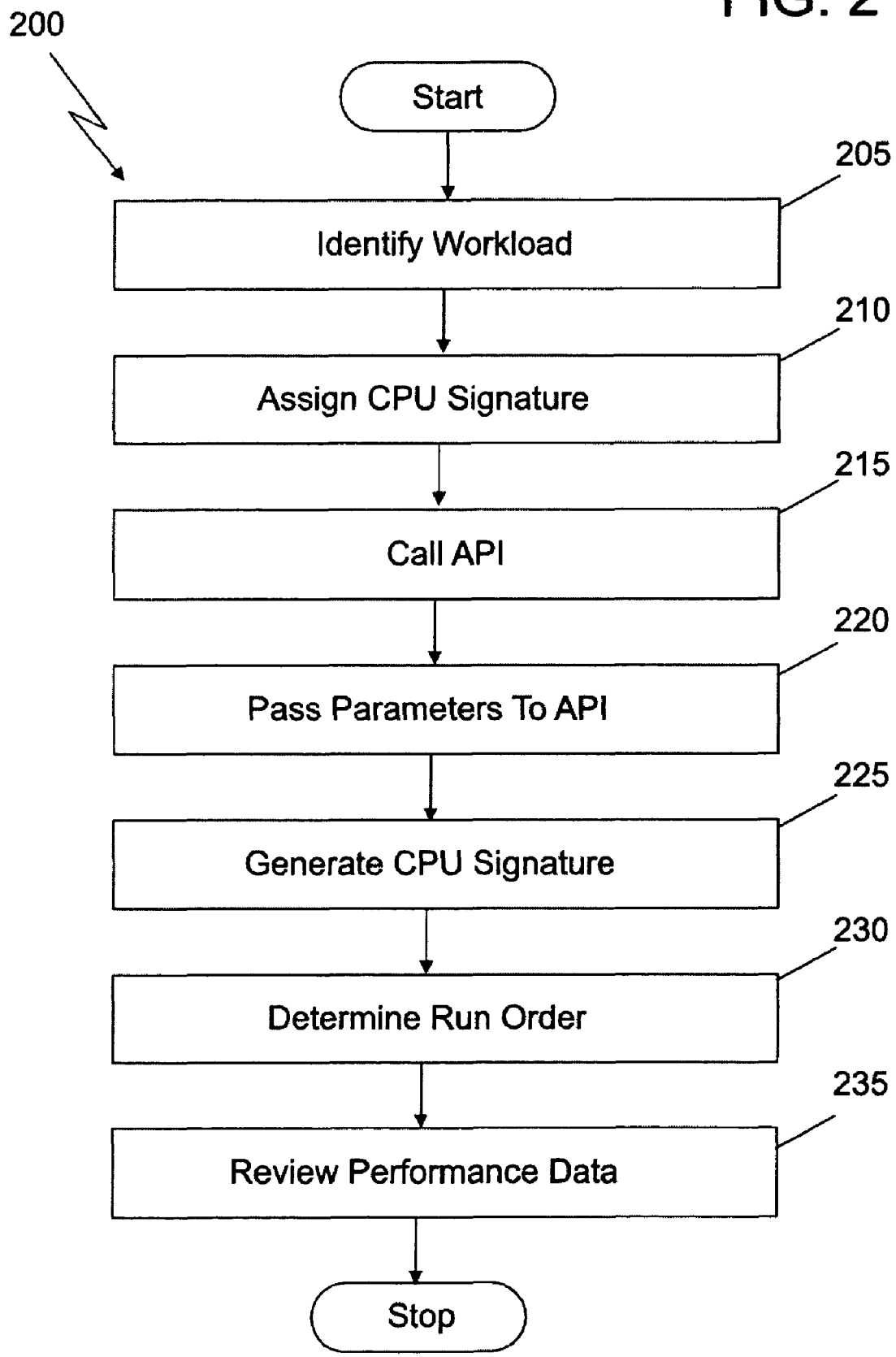
FIG. 2 illustrates a flow chart of a method for CPU signaturing to aide in performance analysis in accordance with exemplary embodiments.

FIG. 2 illustrates a flow chart of a method 200 for CPU signaturing to aide in performance analysis in accordance with exemplary embodiments. At block 205, the system 100 identifies a workload having one or more testcases, the workload is configured to generate a performance run by invoking applications that simulate certain interactions in the performance analysis. At block 210, the system 100 assigns a CPU signature to each of the one or more testcases. At block 215, the system 100 calls a CPU signature API (e.g., API 113) that toggles the CPU (e.g., the processor 105) to generate the CPU signature. At block 220, the system 100 passes four parameters to the CPU signature application programming interface, the four parameters including a CPU signature value, a CPU signature duration, a CPU signature number and a CPU signature idle. At block 225, prior to running each of the one or more testcases of the workload, the system generates the CPU signature, the CPU signature showing the CPU running at the CPU signature value for the CPU signature duration a total of the CPU signature value with a CPU signature idle time period between each of the one or more testcases. At block 230, the system dynamically determines a run order of the one or more testcases at a run time of the workload. At block 235, the system (or performance analyst or other user (e.g., through post processing)) 100 reviews the performance data during the running of each of the one or more testcases, each of the one or more testcases being identifiable by its respective CPU signature.

EXAMPLE

Figure 3:
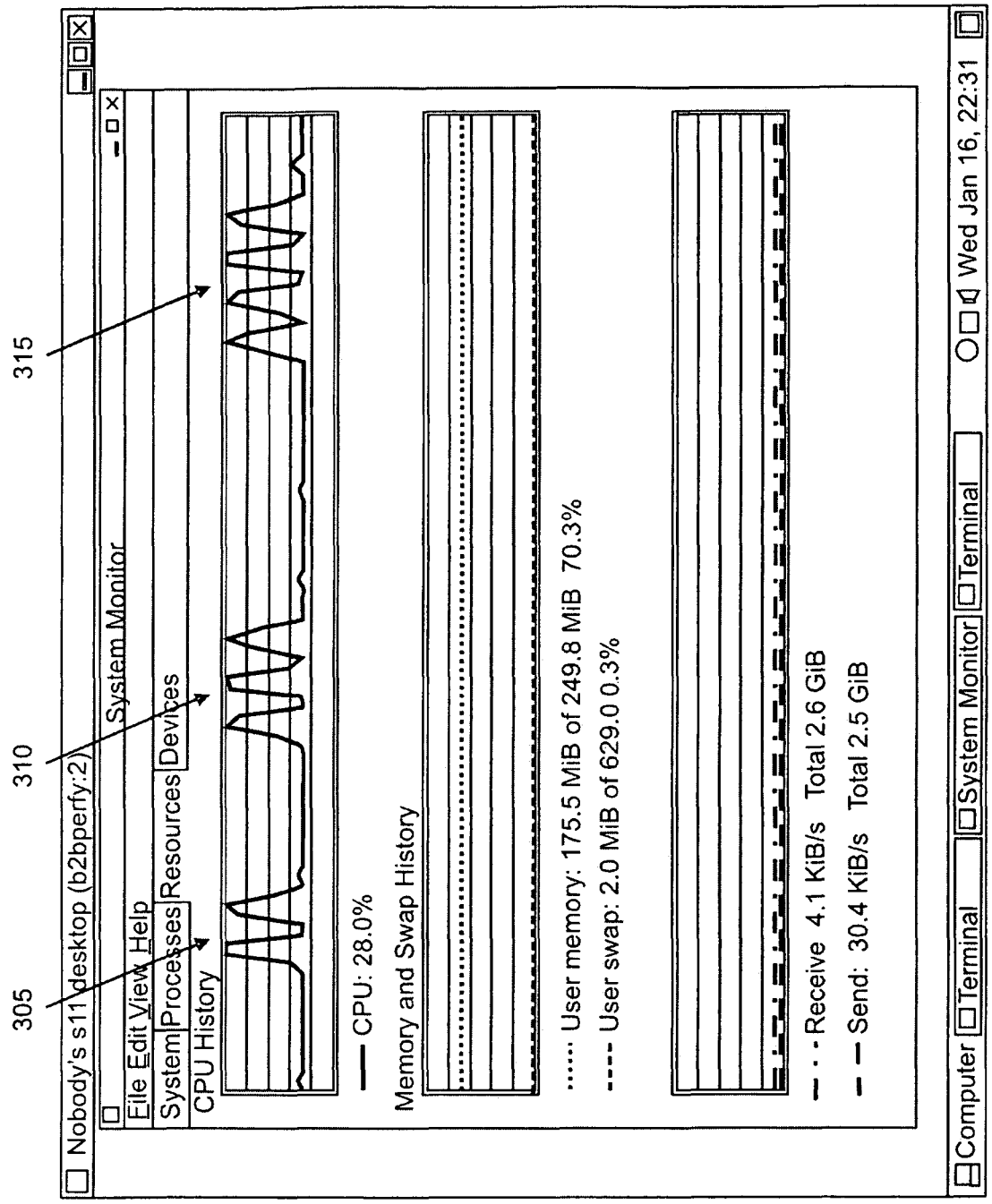
FIG. 3 illustrates a screenshot of a series of CPU signatures in accordance with exemplary embodiments.

FIG. 3 illustrates a screenshot 300 of a series of CPU signatures in accordance with exemplary embodiments. The screen shot 300 illustrates a graphical representation of CPU signatures 305, 310, 315 that would also be evident in a performance report. In exemplary embodiments. While a user views the performance report, the performance analyst could immediately pick out these same three signatures 305, 310, 318 found on the graphical view. In FIG. 3, there are three distinct signatures 305. The first signature 305 includes two CPU spikes, the second signature 310 includes three CPU spikes and the third signature includes four CPU spikes. Each of these CPU signatures 305, 310, 315 represents the beginning of a new workload. Since the CPU outside of the CPU signature across each workload is similar and because the time variation of the three workloads is different, the CPU signatures 305, 310, 315 provide a unique indication of the beginning of each workload. It is appreciated that the screenshot 300 provides a GUI that displays the CPU signature. Currently, a performance analysis, in most cases, uses a tabular view of data that has been collected, which can be difficult to view. This screenshot 300 view shows the same CPU signature that would be available in the tabular form by simply looking at (in this case) the CPU utilization value.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system having a CPU, a performance analysis method, consisting of:
   identifying a workload having one or more testcases, the workload configured to generate a performance run by invoking applications that simulate certain interactions in the performance analysis;
   assigning a CPU signature to each of the one or more testcases;
   calling a CPU signature application programming interface that toggles the CPU to generate the CPU signature;
   passing four parameters to the CPU signature application programming interface, the four parameters including a CPU signature value, a CPU signature duration, a CPU signature number and a CPU signature idle;
   prior to running each of the one or more testcases of the workload, generating the CPU signature, the CPU signature showing the CPU running at the CPU signature value for the CPU signature duration a total of the CPU signature value with a CPU signature idle time period between each of the one or more testcases;
   dynamically determining a run order of the one or more testcases at a run time of the workload; and
   reviewing performance data during the running of each of the one or more testcases, each of the one or more testcases being identifiable by its respective CPU signature,
   wherein the CPU signatures are generated from the group consisting of: CPU utilization, disk access, memory allocation and thread allocation.

* * * * *